April 21, 1970     D. SILVERMAN     3,507,540

METHOD AND APPARATUS FOR CUTTING LARGE DIAMETER BORE HOLES

Filed April 5, 1968     4 Sheets-Sheet 1

INVENTOR.
DANIEL SILVERMAN
BY Paul F. Hawley
ATTORNEY

April 21, 1970   D. SILVERMAN   3,507,540
METHOD AND APPARATUS FOR CUTTING LARGE DIAMETER BORE HOLES
Filed April 5, 1968   4 Sheets-Sheet 2
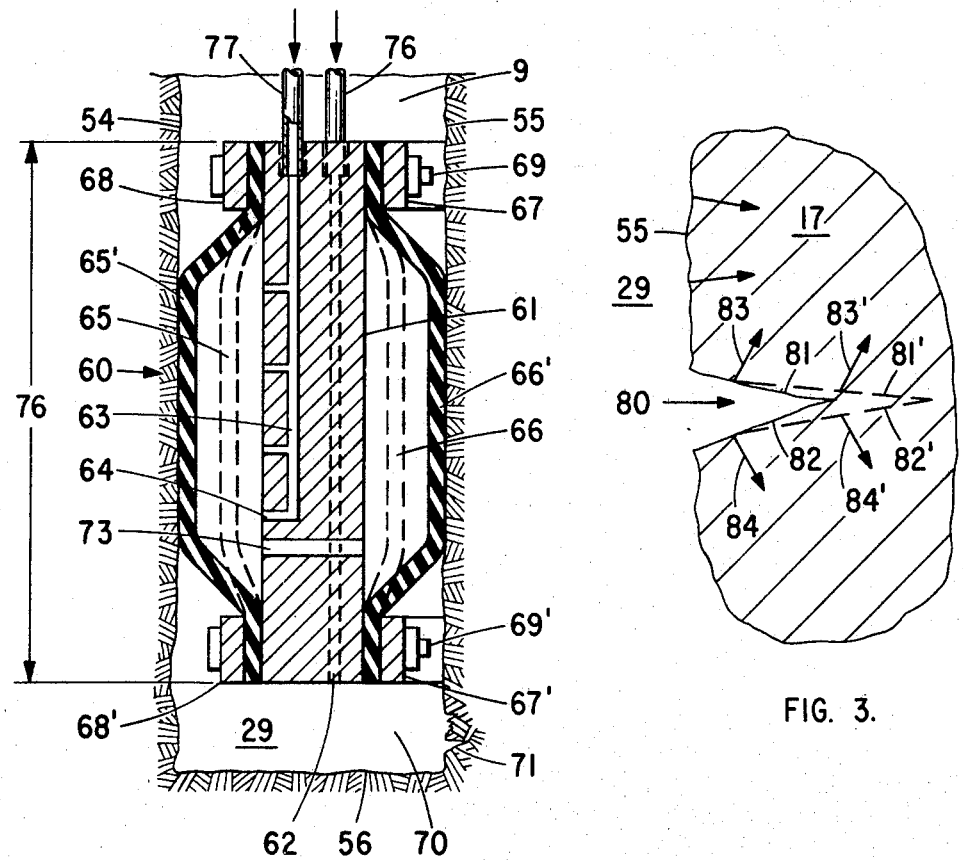
FIG. 4.
FIG. 3.
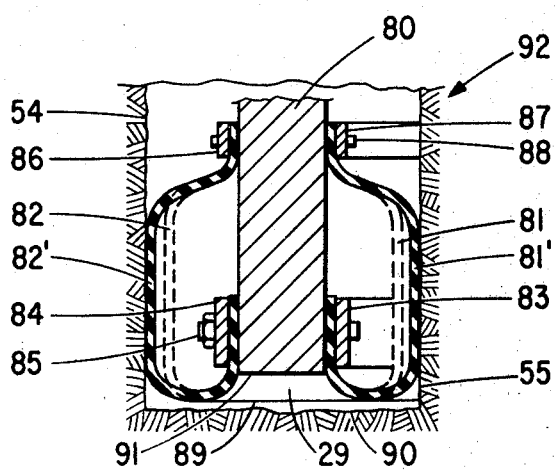
FIG. 5.
INVENTOR.
DANIEL SILVERMAN
BY Paul F. Hawley
ATTORNEY April 21, 1970   D. SILVERMAN   3,507,540
METHOD AND APPARATUS FOR CUTTING LARGE DIAMETER BORE HOLES
Filed April 5, 1968   4 Sheets-Sheet 3

INVENTOR.
DANIEL SILVERMAN
BY
Paul Fahrney
ATTORNEY

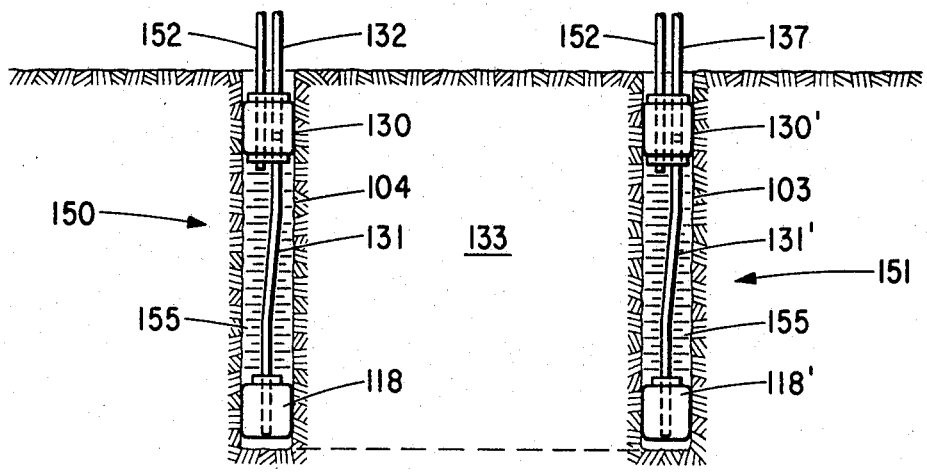
FIG. 8.
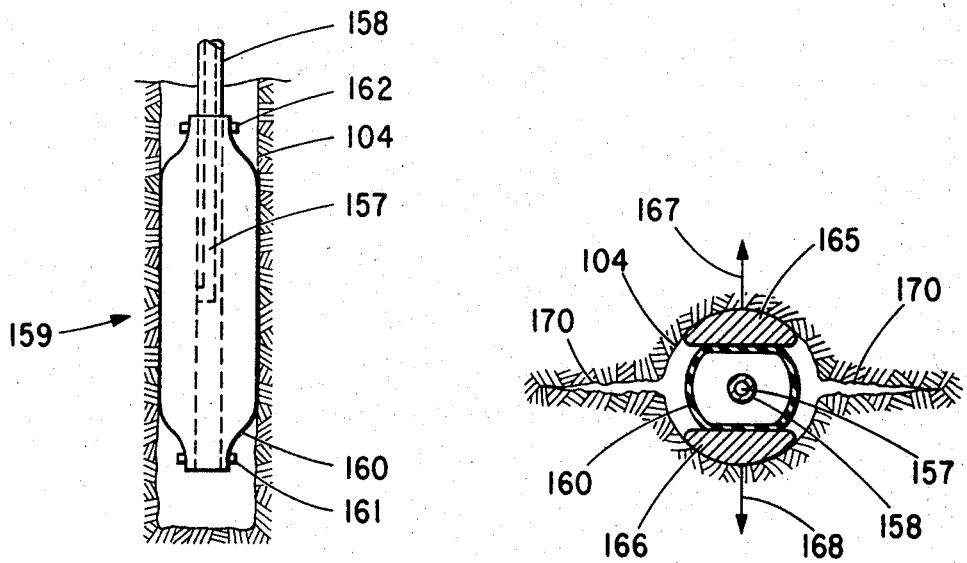
FIG. 9.
FIG. 10.
INVENTOR.
DANIEL SILVERMAN
BY Paul F Hawley
ATTORNEY

United States Patent Office 3,507,540
Patented Apr. 21, 1970

3,507,540
METHOD AND APPARATUS FOR CUTTING LARGE DIAMETER BORE HOLES
Daniel Silverman, Tulsa, Okla., assignor to Pan American Petroleum Corporation, Tulsa, Okla., a corporation of Delaware
Filed Apr. 5, 1968, Ser. No. 719,206
Int. Cl. E21c 37/06
U.S. Cl. 299—15
10 Claims

ABSTRACT OF THE DISCLOSURE

In this method of cutting large diameter bore holes or tunnels in hard rock, a narrow, circular groove or channel of the same diameter as the bore hole is cut. The axis of the channel is aligned in the direction of the axis of the bore hole. A circular packer is fitted into and placed close to the base of the channel, where it is inflated to seal off a small volume close to the base of the channel. A fracturing liquid is pumped into this packed-off volume and the pressure increased until a transverse fracture is created that will separate the central rock core inside the channel from the body of the rock.

BACKGROUND OF THE INVENTION

This invention is concerned with the drilling or cutting of large bore holes or tunnels in hard rock. More specifically it is concerned with a method of drilling in which most of the rock is removed from the bore hole in large pieces as contrasted with those methods in which the rock is cut, broken, chipped, or ground into small pieces to be removed.

In the prior art, large diameter holes have been cut in rock by several methods. One common method of tunneling in hard rock is to drill a plurality of small diameter holes over the working face, spaced from each other by predetermined distances. These holes are then loaded with explosive and detonated together. All the rock between the holes is fragmented and removed (ordinarily by shovels) to expose a new working face, and the process repeated.

In other processes the entire working face is cut back by a large rotating structure that has blades or bits that cut into the rock and remove small bits or flakes. These are gathered and carried back to the mouth of the tunnel.

Similarly in drilling large diameter vertical bore holes, large drilling cutter assemblies have been used which comprise a plurality of bits arranged at increasing radii on the face of the assembly, so that as the cutter assembly rotates the individual bits cut annular areas until the entire working face is ground or cut away.

All of these methods are inefficient in that they utilize energy to break up the rock into very small pieces. In the method of this invention, this is not the case, most of the rock being removed in very large pieces or chunks.

SUMMARY OF THE INVENTION

In this invention a large bore hole is driven by first cutting a circular channel or kerf, as narrow as conveniently possible. The outer diameter of this channel is preferably the same as the diameter of the bore hole, and the axis of the channel coincides with the axis of the bore hole. This channel is cut to any convenient depth to form a central core of rock that is left intact. The next step is to break off this column of rock by a transverse fracture at, or very near to its base, that is, very near to the base, bottom, or far end of the channel. This is accomplished by placing in the channel a circular ring packer that can be positioned close to the bottom of the channel and inflated to press against the walls of the channel to seal off against liquid pressure a small angular ring volume at the base of the channel. Means are provided to pass through the packer into the sealed-off space a volume of fracturing liquid. Means are provided to increase the pressure on this liquid which, pressing on minor cracks and fissures in the rock wall will cause a fracture to form substantially transverse to the axis of the rock column. When this fracture has progressed across substantially the entire cross section of the rock column, the packer is deflated and removed and the column of rock is removed from the bore hole. The channel is then cut further to a desired depth and the process is repeated.

Alternatively, it is possible to drill a small diameter holes in the column of rock, preferably along the cylindrical axis of the bore hole, that is, along the axis of the rock column. This is drilled to about the same depth as the channel. A packer such as are commercially available is placed in this central hole, and inflated or set. Fracturing liquid is injected beneath the packer into the small isolated volume at the base of the hole. The pressure on this liquid is increased until the rock fractures, severing the annular column of rock from the body of rock. The packer is then deflated, removed from the bore hole, and the rock column removed.

It is therefore an object of this invention to drill or cut a bore hole or tunnel in a body of rock by cutting or chipping a minor fraction of the total volume of rock, and to remove the major fraction of the rock in one piece or at most in a few large pieces or chunks. This and other details, advantages, and objects of this invention will be clear from the following description taken in conjunction with the attached drawings, in which:

DESCRIPTION OF THE DRAWINGS

FIGURE 3 is a schematic drawing illustrating one possible way in which the fracturing takes place.

FIGURES 4 and 5 illustrate two ways to construct a circular ring packer for carrying out the embodiment of FIGURE 1.

Figure 6:
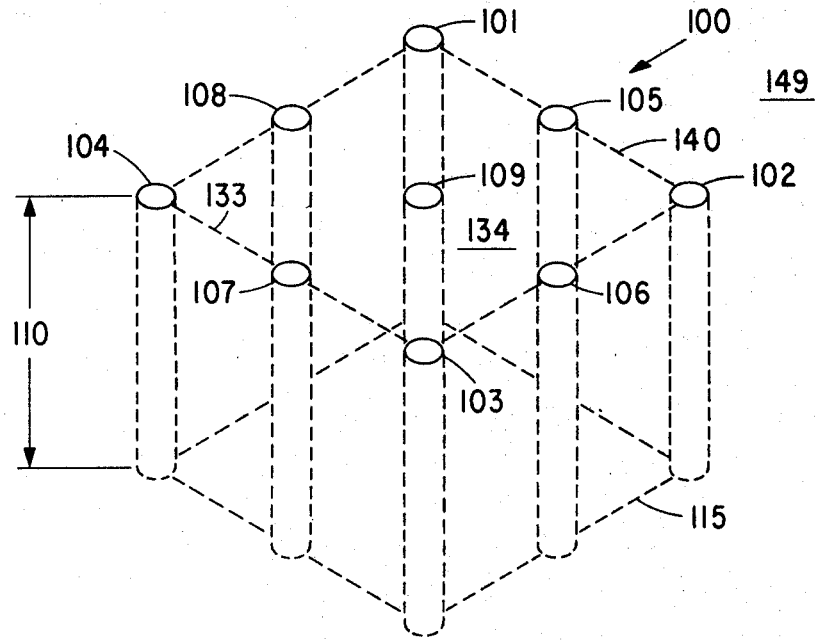
FIGURE 6 shows an embodiment in which the bore hole is a rectangular cylinder, the view being oblique. An elevation of this is shown in FIGURE 7.
Figure 7:
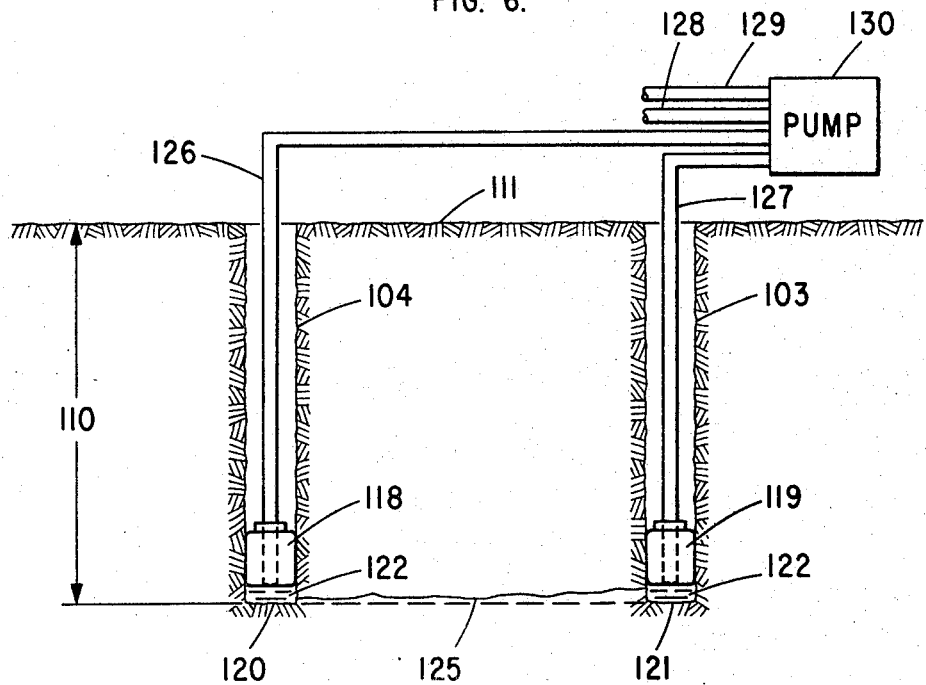

Double packers in the embodiment of FIGURES 6 and 7 are shown in FIGURE 8.

Flexible expanding packers usable in this invention are shown in FIGURES 9 and 10.

DESCRIPTION OF THE PREFERRED EMBODIMENTS

Figure 1:
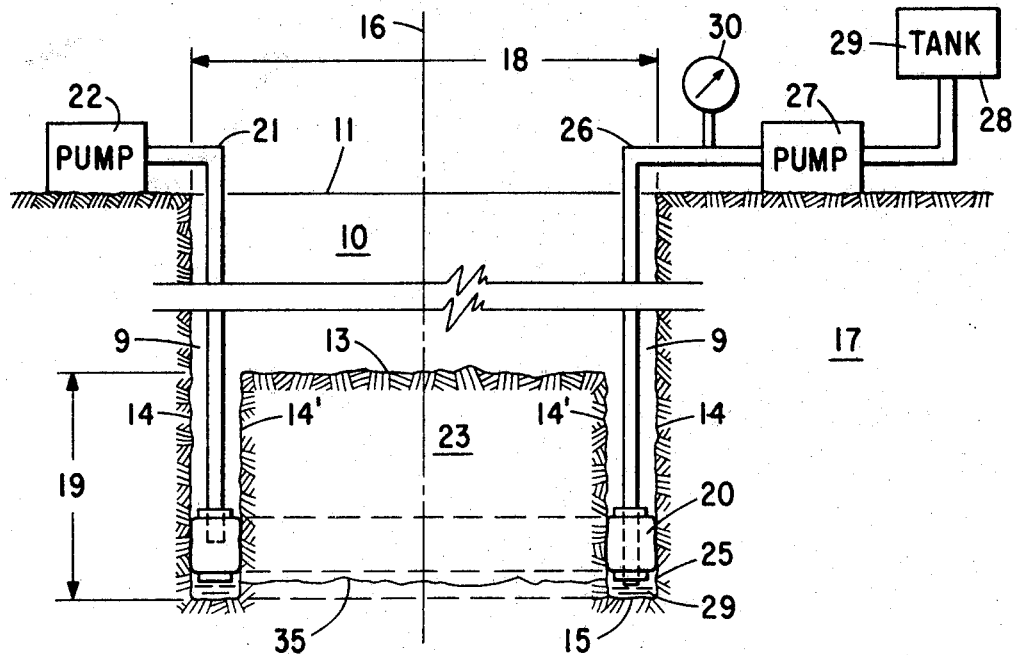
FIGURE 1 is a vertical section of the preferred embodiment of this invention in which the fracture is induced by packing off the bottom of an annular channel and using fracturing liquid at high pressure to create the fracture.

Referring now to the drawings, and particularly to FIGURE 1, I show a preferred embodiment of this invention. Shown is a vertical bore hole 10 in a volume or mass of rock 17. This has a surface 11. The bore hole has a diameter 18 and has progressed down to a certain depth to a working face 13. By means of a drilling device, not shown but such as is well known in the art, a circular kerf or channel 9 is cut to a depth 19 below the working face 13.

The manner of cutting this kerf or channel is well known and does not form part of this invention. Machines are available having a circular cylindrical wall or tube carrying cutting blades on the end and along the inner and outer surfaces of the wall such that by rotating this tube about its axis and pressing the cutting blades against the rock, a channel will be cut. One such means is disclosed in U.S. Patent No. 3,325,217, to R .W. Enz, in which he shows in FIGURES 3–8 details of an apparatus used for cutting a circular channel in rock leaving an upstanding cylindrical core of rock. Other means for cutting such a channel are also well known in the art.

Having cut the channel 9 of the desired depth 19, which depth is normally limited by the dimensions of the drilling machine, the next step is to break off and remove the central rock column 23. Although rock is a brittle material, and in small diameters can be readily broken by bending, in the large diameter of the column 23, it is difficult if not impossible to break it off at the base 15 by purely mechanical transverse force.

As shown in FIGURE 1, I place a circular ring packing means 20 in the channel near to the base 15. This leaves a small annular volume 25 that is sealed off by the packer 20 when it is inflated and presses against the walls 14, 14'. The packer 20 is shown in more detail in connection with FIGURES 4 and 5. Suffice for the present that when the packer is in position, it can be inflated by means of pipe 21 and hydraulic means 22 (such as a pump) to seal off the annular volume 25. The packer also has a conduit 26 which passes through the packer to the annular space below. Through this conduit 26 is pumped an appropriate viscous fracturing liquid 29 from container 28 by means of pump 27. The fracturing liquid may be water thickened with bentonite, water-soluble gums such as starch, guar gum, or the like, or oil thickened with Napalm (a mixture of heavy metal soaps), etc. A pressure gauge 30 may be used to indicate the pressure. When the fracture occurs, of course, the pressure is released and the gauge 30 will show this.

In FIGURE 3 I show to enlarged scale the contour of the wall 55 of the hole 9 in FIGURES 1 and 4. This enlarged view shows the natural roughness of the rock as cut by the bit. If there are one or more fissures or indentations, such as 80, (corresponding to 71 of FIGURE 4), the liquid 29 will fill the indentations. The hydrostatic pressure in the liquid 29 will exert forces over the surface 55 of the rock 17. These forces will be substantially perpendicular to the surface. Thus, at the notch 80 there will be forces 83, 84 against the surfaces 81 and 82, respectively. These are directed in almost opposite directions, tending to tear the rock apart in tension, that is, to open or widen the notch 80. If this happens, the notch surfaces will extend out to 81', 82' shown dashed, with forces 83', 84' still directed away from each other. By this means the fracture is extended until it progresses in toward the center of the rock column. In this manner the fracture will extend completely across the column, and the rock column will be completely separated from the base rock along such a fracture surface as 35 in FIGURE 1. The packer 20 is deflated and removed and the rock column then can be lifted out of the bore hole. A new working face 35 is then presented and the process is repeated.

If the rock 17 is porous and permeable and the fracturing liquid 29 is not viscous, as the pressure is built up in the liquid, it will flow into the pores of the rock, and a suitably high pressure needed to fracture the rock will not be built up. On the other hand, if the rock is dense and impermeable, plain water would be suitable for this step. Therefore, the viscosity or mobility of the liquid required is a function of the type and condition of rock involved.

The design of a suitable liquid for fracturing rock is an art that is well known in the fracturing of oil wells to increase the communication between the well bore and the oil reservoir some tens or hundreds of feet back from the well bore. See, for example, U.S. Patent Reissue 23,733 issued May 13, 1952 to R. F. Farris, entitled Fracturing Formations in Wells. The liquids suggested above as possible fracturing liquids are shown by way of example, and any of the conventional fracturing liquids (sometimes called low-penetrating fluids) can, of course, be used.

By placing the fracturing liquid 29 into the groove or channel 9 to occupy the volume 25, the hydrostatic pressure works on both sides 14, 14' of the channel, and will tend to create fractures on both sides of the channel. However, since the length of the column of natural rock from 15 to the surface 11 is greater than the column inside the bore hole from 15 to 13, the lifting forces 83 will have a greater effect on the rock column 23 than on the base rock 17. In other words, as the pressure is built up in liquid 29, a notch 80 on the inside wall of the channel will ordinarily give way and expand before a corresponding notch on the outside wall of the channel will receive enough pressure to form and extend a fracture.

In FIGURE 4 I indicate in schematic fashion a ring-type packer that could be used in the embodiment of FIGURE 1. In this figure the channel 9 with walls 54, 55 has a bottom 56. The packer 60 comprises a circular ring 61 of metal of a diameter such that it can be positioned in about the center of the channel 9. There are two loops of impervious, reinforced flexible sheet material, such as rubberized fabric 65, 66, of about the same width as that of ring 61. One of these loops 66 is placed on the inside and the other loop 65 on the outside of the ring 61. These are bolted or otherwise fastened along their edges to the ring by means of strips 67, 68, 67', and 68' and bolts 69, 69' so as to seal the space inside the strips 65, 66. There is one hole 63 drilled vertically in the ring from the top to a point above the bottom. Holes 64 are drilled through the wall of the hole 63 so that the inside of hole 63 communicates to the packer space inside the strips 65, 66. Another hole 62 is drilled vertically through the ring 61 and communicates with the sealed-off space 70 between the packer and the bottom 56 of the channel. Pipes 77, 76 are threaded into the holes 63, 62. Appropriate liquids are pumped, through 77 and 63 to the packer space to inflate the packer and through 76 and 62 to apply and pressurize the fracture fluid in the space 70, respectively. Opening 73 is drilled through the ring 61 so that the space on both sides of the ring are in communication with each other.

In operation, the packer is positioned in the channel as shown. The hydraulic liquid is conveyed through 77, 63, 64, and 73 into the packer space between strips 65 and 66. The pressure is increased until the strips are bulged out in the form 65', 66' where they press tightly against the walls 54, 55. Fracture liquid is then flowed in through pipes 76, 62 to the space 70 below packer 60. The pressure on the fracture liquid in space 70 is then increased until a fracture starts at a notch, such as 71, and expands and spreads to finally separate the rock column from the base rock.

Figure 2:
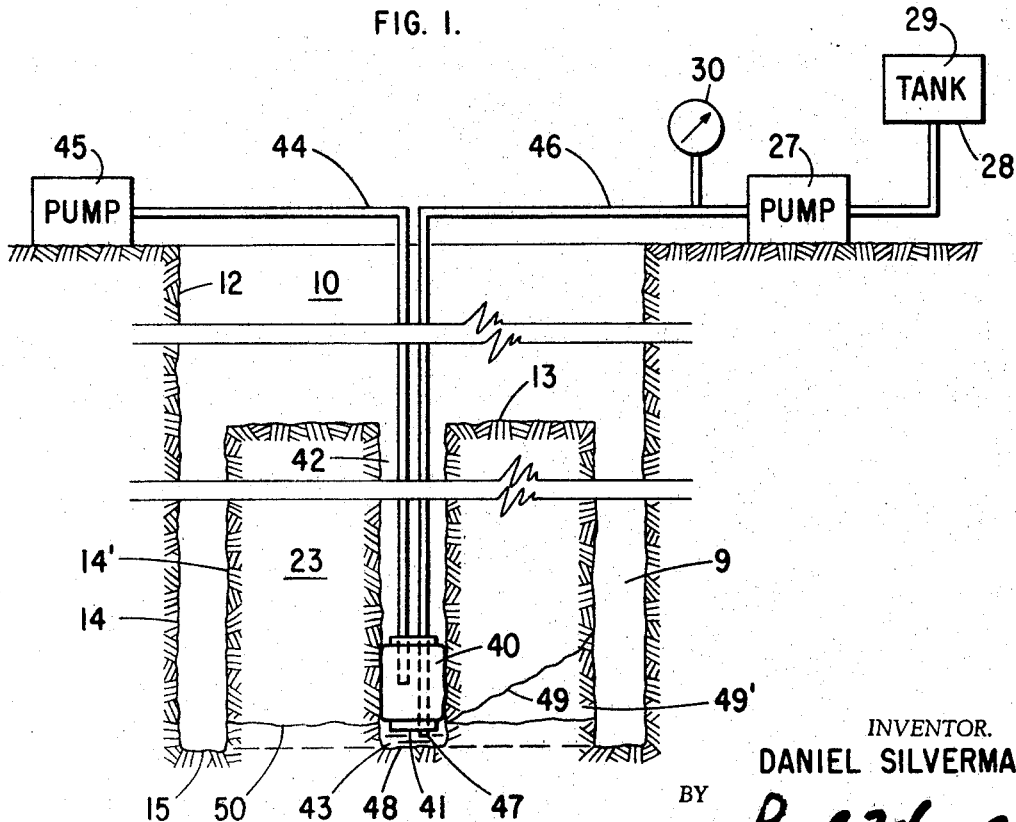
FIGURE 2 is a vertical section of another embodiment of this invention in which a central pilot hole is drilled in which the packer and fracture liquid are placed.

In FIGURE 2 I show another version of this invention. In this case, in addition to the annular cut or channel 9 with walls 14, 14', I have a small diameter hole 42 drilled along the axis of the borehole to a depth such that the bottom 48 is about the same level as 15, the bottom of the channel. A cylindrical packer 40 is placed near the bottom 48 of the hole, to isolate and seal a small volume 43. Fracture liquid 29 is introduced into this volume by pump 27 through pipe 46 to outlet 47. As in the case of FIGURE 1, the fracture liquid exerts a lifting force on the rock column 23 and forms a fracture 50 that separates the column from the base rock. The packer 40 is deflated and removed and the rock calumn is lifted out of the bore hole. While I show the hole 42 on the axis of the bore hole, and this is the preferred position, the hole 42 can be drilled longitudinally into the core 23 in any position.

As in the case of FIGURE 1, the packer of FIGURE 2 is placed preferably close to the bottom so that the pressurized fracture liquid is positioned close to and at the bottom, so that the fracture when formed will be as close to the bottom as possible. In this way the volume of rock removed will be as great as possible. Also, the fracture surfaces 35, 50 may not always be a true transverse surface. The fracture may occur at naturally occurring planes of weakness in the rock and may diverge, such as 49, leaving a large point of rock 49' standing in the hole. Assuming that the depth 19 of the cut is limited by the construction of the drilling device, it is always preferable to break off the rock column on a transverse plane, such as 50, rather than a sloping surface, such as 49, to permit a deeper second cut in the channel. Placing the packer in the channel 9, as in FIGURE 1, will facilitate this.

While this invention may make use of conventional drilling machines to cut the annular channel, and conventional fracturing liquids to create the fracture, part of the novelty lies in the use of a ring-type packer, and packers generally of improved design which permit placement of the packer close to the bottom. This limits the depth of the hole occupied by fracture liquid and controls the position of the fracture close to the bottom of the channel or hole.

This is shown in FIGURE 5 in which the circular ring packer 92 is assembled with flexible loops 81 and 82 fastened at the bottom as shown. That is, the strips 83, 84 and bolts 85 are placed inside the packer. The top strips 86, 87 are fastened as in FIGURE 4. When the packer 92 is expanded, loops 81, 82 move to 81', 82' and the volume 89 between the bottom of the packer 91, 81', 82' and the bottom 90 of the channel is as small as possible. A similar construction can be applied to the cylindrical packer 40 of FIGURE 2.

I have shown in FIGURES 1 and 2 a condition in which the contour of the bore hole is a right circular cylinder and the central core of rock is completely isolate by a circumferential channel 9, so that when the fracture 35 is formed, the core is completely free. However, this invention is not limited to these conditions.

In FIGURE 6 I show an embodiment in which the bore hole is a cylinder, the cross section of which is rectangular. While I show a square or rectangular pattern, it could just as easily be a circular pattern. The central core of rock 134 is not completely surrounded by a channel, but a cylindrical surface 140, shown in dashed form, is marked by a plurality of small drilled holes 101, 102, 103, etc. These need not be in contact with each other. That is, their cross section need not overlap, but can be spaced apart. These holes define a zone of weakness which coincides with the contour of the cylindrical surface 140 which will be the wall of the bore hole after the rock 134 is removed.

A hole 109 is drilled within the contour of the cylindrical surface to the same depth 110 of the holes 101, 102, etc. In the manner of FIGURE 2, a packer is placed in 109, a fracturing liquid is placed below the packer and the pressure increased until a transverse fracture occurs, such as 125 in FIGURE 7.

The rock core is not entirely free, however, because of the webs of rock 133 joining the holes 104, 107, 103, etc., for example. The next step is to create a longitudinal fracture between the holes in the plane 133. To do this I use one or more double packers 150, 151, as in FIGURE 8. Each of these packers comprises two expanding elements 130, 118, for example, which are separated by tension means 131. After these are expanded tightly against the rock by supplying packer liquid through pipe 132, fracturing liquid is introduced through pipe 152 into the space 155 in the hole between elements 130, 118. As the pressure is increased, and the hole tries to expand, a fracture will form along a plane of weakness, such as the plane 133 passing through holes 104, 107, 103. If desired, as in FIGURE 8, packers similar to 150 and 151, just described, can be placed in each of the two or more holes 104, 107, 103, etc., in which the fracturing liquid is pressurized simultaneously. In this way, the surface of weakness passing through the perimeter holes can be fractured to completely free the volume of rock within the perimeter.

As shown in FIGURE 7, it is not necessary to drill the hole 109 to create the transverse fracture. Any one, or more than one, of the perimeter holes, such as 104, 103, can be pressurized simultaneously to create a transverse fracture. In FIGURE 7, packers 118, 119 are placed at the bottom of the holes 104, 103, fracturing liquid 122, is placed below the packers and pressurized by pipes 126, 127. Additional pipes 128, 129 from other holes in the perimeter 140 are all pressurized simultaneously by pump means 130 to create the transverse fracture 125.

The rock core 134 of FIGURE 6 is separated laterally from the body of rock 149 by creating longitudinal fractures along the planes 133 of the cylindrical surface 140. These planes 133 have previously been defined as planes of weakness by the drilling of the holes 104, 107, 103, for example. The longitudinal fracture can be formed by confining fracturing liquid in one or more of the holes in plane 133 and increasing the pressure (preferably simultaneously in more than one hole) until the fracture is formed.

The process of forming the transverse fracture, requires the fracturing liquid to be in direct contact with and act upon the rock. Similarly the longitudinal fractures are preferably formed with the fracturing liquid in contact with the rock as in FIGURE 8. However, in the case of longitudinal fractures, the fracturing liquid need not be in contact with the rock, but can be confined in a flexible, expansible packer 159 as in FIGURE 9. This comprises a cylindrical boot 160 of flexible material, such as rubberized fabric, fastened in sealing contact to the structure 158 by means such as clamps 161, 162. Packer liquid is forced down structure 158 through conduit 157 into the space inside the boot 160 to inflate and press it into contact with the wall of hole 104. This pressure is raised until the rock expands and fractures along the plane 133.

A further modification of the packer 159 is shown in FIGURE 10. Here the boot 160 is confined between two plates 165, 166 shaped so as to conform to the walls of the hole. The expanded boot 160 presses on the plates 165, 166, pressing them outward and exerting forces 167, 168 on the wall of the hole 104. These forces 167, 168 tend to tear the rock apart, causing a tension fracture 170 to form. In general, the fracture plane will be substantially perpendicular to the plane passing through the plates 165, 166. Thus, by orienting the packer and plates, the placement of the plane of the fracture can be facilitated.

It is clear that to isolate a cylindrical core of rock from a body of rock, the core must be separated laterally along a surface representing the cylinder, as well as longitudinally at the base of the cylinder. The longitudinal separation must be by means of a transverse fracture, as illustrated in FIGURES 1, 2, and 7. On the other hand, the lateral separation can be accomplished by actually cutting a closed channel in the rock, as in FIGURES 1 and 2, or by removing material over a portion of the surface bounding the rock core, and fracturing the rock over the remainder of the surface, as shown in FIGURES 6 and 8. These longitudinal fractures can be formed by confining fracturing liquid to one or more holes in the plane of the fracture-to-be, as in FIGURE 8, or to use long packers in the holes as shown in FIGURES 9 and 10. These packers serve only to provide a tensile stress in the rock in the vicinity of the hole sufficient to cause rupture. They are not intended to, nor do they break up or crumble the rock in the core.

If the process of FIGURE 1 is to be used, it is preferable to cut the circumscribing channel before the transverse fracture is formed. In the case of FIGURE 6, the reverse is true, and the order of steps would preferably be (1) drill the holes 101, 102, etc., of FIGURE 6, (2) form the transverse fracture 125, FIGURE 7, and (3) form the longitudinal fractures 133 as in FIGURES 8, 9, 10.

The reason for this is that to break off the central rock core by hydraulic fracturing, the rock has to be free of fractures. Also, it is easier to break the core off if it is completely separated transversely from the body rock. Thus in the case of FIGURE 1, where there are no fractures, the circular channel is cut, and then the fracturing can be done in the channel or in a separate central hole. In the case of FIGURE 6, the holes 101, 102, 103, 104 can be used as in FIGURE 7 to provide the transverse fracture 125, or as in FIGURE 8 to provide the longitudinal fracture 133. But these holes can't be used for both since the first fracture prevents building up fracture pressure. Since the transverse fracture can only be made hydraulically, it should preferably be done first as in FIGURE 7, and then the longitudinal fracture done by packers as in FIGURES 9 and 10. However, if a central hole 109 is provided, the fractures 133 can be done first as in FIGURE 8, and the transverse fracture done in hole 109.

It will be clear that although I show my invention in use in a vertical bore hole, it can be utilized equally well in driving or drilling a horizontal bore hole or tunnel. And while I have shown several embodiments, it will be possible for one skilled in the art, on the basis of the principles outlined, to devise many more embodiments, all of which are claimed as part of this invention, the scope of which is to be limited only by the scope of the following claims.

I claim:
1. The method of removing a central core of rock from a large body of rock to form a bore hole, the wall of which is a surface of arbitrary cross section and large transverse dimension, in which the major portion of rock in the central core within said surface is adapted to be removed in large pieces, comprising the steps of,
   (a) separating said central core of rock from said body of rock along said surface to a depth D,
   (b) placing in and confining a fracturing liquid to a small volume excavated in said rock substantially at the depth D,
   (c) increasing the pressure in said fracturing liquid until a fracture substantially transverse to the axis of said surface occurs across said central core of rock and separates it longitudinally from said body of rock, and
   (d) removing said separated central core of rock from said bore hole.

2. The method as in claim 1 in which the step of confining a fracturing liquid comprises the steps of drilling a small diameter hole in said central core or rock to a depth D, and placing in said hole pack-off means to contain and seal off a volume of fracturing liquid substantially at the base of said hole.

3. The method as in claim 1 in which step (a) includes in part the step of (1) drilling to a depth D a plurality of small holes substantially parallel to the axis of said surface and spaced apart in said surface, and the step (b) comprises the step of (2) placing in at least one of said small holes pack-off means to contain and seal off a volume of fracturing fluid substantially at the depth D.

4. The method as in claim 1 in which said surface is a right circular cylinder, and the step of separating along said surface said central core of rock comprises cutting a narrow cylindrical channel in the form of said surface to a depth D in said body of rock.

5. The method as in claim 4 in which the step of confining a fracturing liquid comprises the step of placing in said channel substantially at the base thereof, circular ring pack-off means capable of containing and sealing off a volume of fracturing liquid at the base of said channel.

6. The method as in claim 1 in which the step of separating said central core of rock comprises the steps of (1) drilling to a depth D a plurality of small holes substantially parallel to the axis of said surface and spaced apart in said surface, (2) placing in at least one of said holes a fracturing liquid confined to a volume intermediate the ends of said holes, and (3) increasing the pressure in said fracturing liquid until a longitudinal fracture occurs in said surface.

7. The method as in claim 6 in which step (2) comprises placing the fracturing fluid inside an expandable bladded in said hole, said bladder restrained against expansion along said hole but capable of expansion radially against the wall of said hole.

8. A method of drilling a large diameter substantially circular bore hole in a body of rock in which operation the major portion of rock material is removed in large pieces, comprising the steps of,
   (a) cutting a narrow substantially circular channel in said rock to a depth D,
   (b) placing in and confining a fracturing liquid to a small volume excavated in said rock substantially at the depth D,
   (c) increasing the pressure in said fracturing liquid until a fracture substantially transverse to the axis of said channel occurs across the central core of rock and separates it axially from said body of rock, and
   (d) removing said separated central core of rock from said bore hole.

9. The method as in claim 8 in which said placing and confining step comprises the steps of
   (a) drilling a small diameter hole into said central core of rock to said depth D,
   (b) placing pack-off means in said hole close to the base thereof, expanding said pack-off means against the wall of said hole to seal against fluid pressure a small volume substantially at the depth D in said hole, and
   (c) inserting a fracturing liquid into said small volume.

10. The method as in claim 8 in which said placing and confining step comprises the steps of,
   (a) placing a ring pack-off means in said channel close to the base thereof, expanding said pack-off means against the walls of said channel to pack-off against fluid pressure a small ring volume substantially at the depth D in said channel, and
   (b) inserting a fracturing liquid into said ring volume.

References Cited

UNITED STATES PATENTS

| | | | |
|---|---|---|---|
| 1,630,470 | 5/1927 | Clifford | 299—21 |
| 1,710,486 | 4/1929 | Morgan | 299—16 |
| 2,253,941 | 8/1941 | Pray | 299—21 |
| 2,686,047 | 8/1954 | Duncan | 299—22 |
| 3,325,217 | 6/1967 | Enz | 175—62 |
| 3,401,946 | 9/1968 | Malone | 299—21 X |

FOREIGN PATENTS 1,088,135  9/1954  France.

DAVID H. BROWN, Primary Examiner

U.S. Cl. X.R.

299—21